United States Patent
Herzog

(10) Patent No.: US 7,127,231 B2
(45) Date of Patent: Oct. 24, 2006

(54) METHOD FOR OPERATING A BILLING SYSTEM ASSOCIATED WITH A MOBILE RADIO NETWORK FOR BILLING FOR TARIFFABLE USE OF DATA, AND DATA TRANSMISSION NETWORK

(75) Inventor: Christian Herzog, Berlin (DE)

(73) Assignee: Siemens Aktiengesellschaft, München (DE)

( * ) Notice: Subject to any disclaimer, the term of this patent is extended or adjusted under 35 U.S.C. 154(b) by 353 days.

(21) Appl. No.: 10/388,594

(22) Filed: Mar. 17, 2003

(65) Prior Publication Data
US 2003/0224754 A1 Dec. 4, 2003

(30) Foreign Application Priority Data
Mar. 18, 2002 (DE) ............................. 102 13 072

(51) Int. Cl.
H04M 1/66 (2006.01)
(52) U.S. Cl. .................................... 455/406; 455/408
(58) Field of Classification Search ............... 455/406, 455/408, 414.1, 414.2, 414.3, 414.4, 432.2, 455/435.1
See application file for complete search history.

(56) References Cited

U.S. PATENT DOCUMENTS

2004/0133486 A1 * 7/2004 Markki et al.

FOREIGN PATENT DOCUMENTS

| DE | 19638072 A1 | 3/1998 |
| DE | 199 46 537 | 4/2001 |
| WO | WO-99/27678 | 6/1999 |
| WO | WO 01/69903 | 9/2001 |
| WO | WO 02/21788 | 3/2002 |
| WO | WO 02/21865 | 3/2002 |
| WO | WO 02/067156 * | 8/2002 |
| WO | WO 02/102016 | 12/2002 |

* cited by examiner

Primary Examiner—William J. Deane, Jr.
(74) Attorney, Agent, or Firm—Morrison & Foerster LLP

(57) ABSTRACT

The invention relates to a system and method for operating a billing system associated with a mobile radio network for billing for tariff based use of data provided by a network-external data store, where the data are used by virtue of their being retrieved using a mobile terminal belonging to a user of the mobile radio network, and to a data transmission network. The mobile terminal transmits a user address identifying the user to an intermediate node connected to the mobile radio network, the intermediate node generates an anonymous user identifier from the user address using an encryption method and transmits it to the data store. The data store transmits a cost variable, associated with the retrieved data, and the anonymous user identifier to the billing system, and the billing system recovers the user address and debits a cost account which is associated with the user.

11 Claims, 1 Drawing Sheet

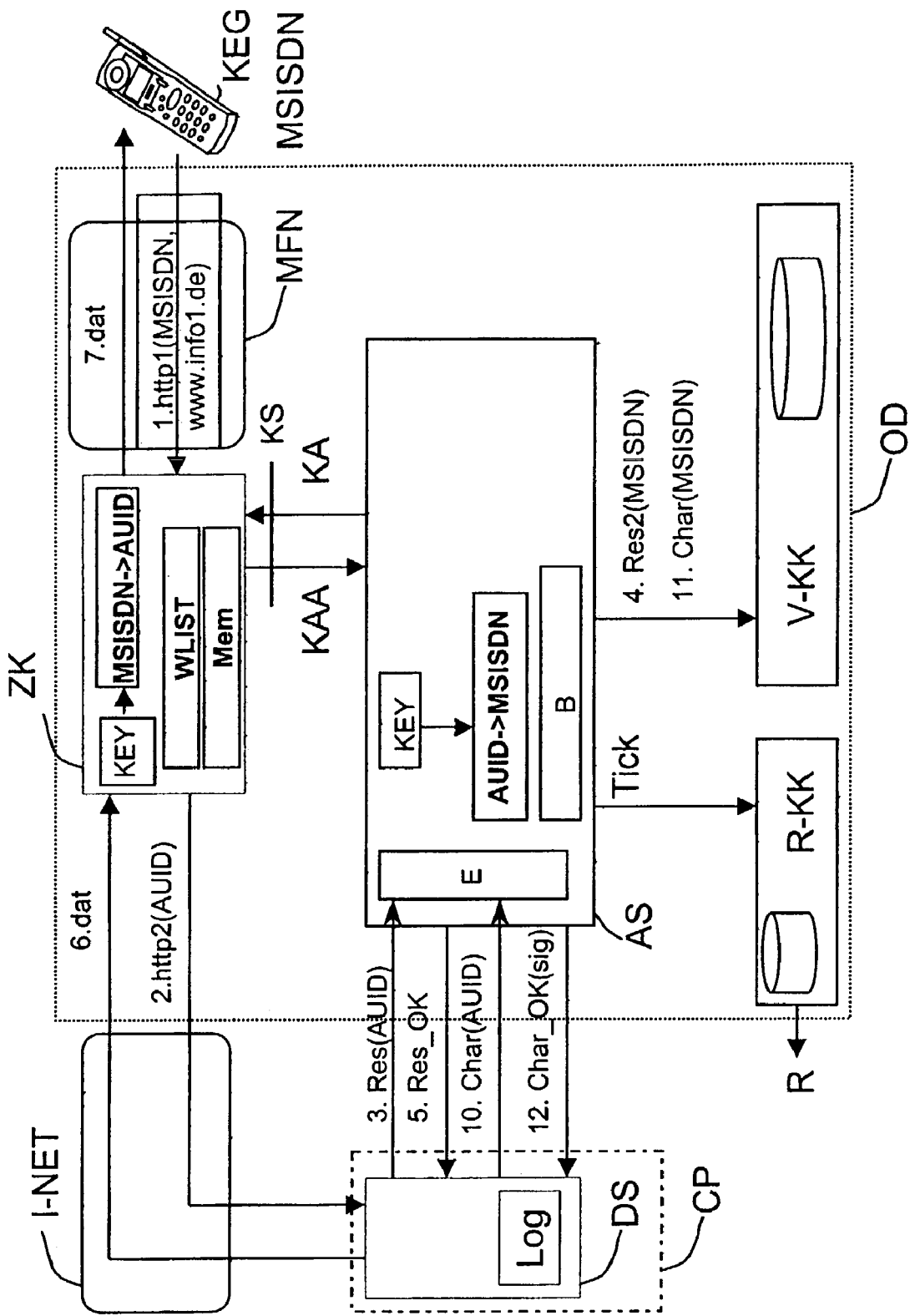

METHOD FOR OPERATING A BILLING SYSTEM ASSOCIATED WITH A MOBILE RADIO NETWORK FOR BILLING FOR TARIFFABLE USE OF DATA, AND DATA TRANSMISSION NETWORK

CLAIM FOR PRIORITY

This application claims priority to Application No. 10213072.8 which was filed in the German language on Mar. 18, 2002.

TECHNICAL FIELD OF THE INVENTION

The invention relates to a system and method for operating a billing system, and in particular, and billing system associated with a mobile radio network for billing for tariff based use of data provided by a network-external data store.

BACKGROUND OF THE INVENTION

In modern mobile communication networks, such as second or third generation mobile radio networks, the users will in future be provided to an increased extent with additional services, "value added services", besides the setting-up and maintenance of simple voice or data links. One important type of these value added services involves providing a user of the mobile radio network with the opportunity to retrieve data which are of interest to him from data stores and to download them to his mobile telephone, for example. The data can be text information, image information, audio data or film data, for example. Such data can also be provided by institutions which are independent of the operators of the mobile radio networks. Use of these value added services will often incur a cost for the mobile radio subscriber.

SUMMARY OF THE INVENTION

The invention relates to a system and method for operating a billing system associated with a mobile radio network for billing for tariff based use of data provided by a network-external data store, where the data are used by virtue of their being retrieved using a mobile terminal belonging to a user of the mobile radio network. The invention also relates to a data transmission network for carrying out this method.

The present invention also specifies a method and a data transmission network which provide a simple and reliable way of billing for the tariff based use of data provided by a network-external data store.

In one embodiment of the invention, there is a method where the mobile terminal transmits a user address, identifies the user, and a data identifier, identifies the data which are to be retrieved, via the mobile radio network to an intermediate node connected to the mobile radio network, the intermediate node generates an anonymous user identifier from the user address using an encryption method and an associated key, the intermediate node transmits the anonymous user identifier and the data identifier to the data store, as a result of which the data store is prompted to transmit a cost variable, associated with the retrieved data, and the anonymous user identifier to the billing system, the billing system using a key associated with the encryption method to recover the user address from the anonymous user identifier, and the billing system using the user address and the cost variable to debit a cost account which is associated with the user. In this case, a particular advantage is that the data store knows only the anonymous user identifier, but not the user address of the mobile radio user. Firstly, this allows the identity of the user to be protected, and secondly, the data store is still able to use the billing system for billing.

In one aspect of the invention, the intermediate node can be connected to the data store via the Internet. Hence, in the inventive method, data can advantageously be transmitted via the Internet easily and conveniently.

In another embodiment of the invention, the billing system debits the user's cost account by virtue of a cost sum being reserved in the cost account in line with the cost variable, a reservation success message being transmitted from the billing system to the data store upon successful reservation, as a result of which the data store is prompted to transmit the retrieved data to the user's terminal via the intermediate node and, upon successful transmission, to send a debit message, including the anonymous user identifier and the cost variable, to the billing system, and the billing system then debiting the cost account in line with the cost variable. With such a sequence, the reservation before the debit operation advantageously ensures that the costs incurred can be billed via the cost account. This significantly reduces the financial risk on the part of the data store and on the part of the data provider.

In one aspect of the invention, when the cost account has been debited by the billing system, a debit success message is transmitted to the data store, as a result of which the data store is prompted to store data relating to the debiting of the account for a subsequent debit check. As a result, the data relating to billing are advantageously stored in the data store, which means that it is subsequently possible to check the billing operations.

In another aspect of the invention, the billing system provides the debit success message with a signature from the billing system, as a result of which it is possible to prove the origin of the debit success message. This means that it is advantageously possible, during a subsequent check on the billing operations, to prove that the debit success message has actually been generated by the billing system.

In still another aspect of the invention, the cost account debited can be a prepaid cost account belonging to the user. This advantageously allows the inventive method to be carried out in connection with the credit accounts (prepaid accounts) known in communication networks.

In another aspect of the invention, the cost account debited can also be a registration cost account belonging to the user, with the entries in the registration cost account being used, following use of the retrieved data, to invoice the user. This advantageously makes it possible to use the invoicing systems (post-paid billing systems) existing in mobile radio networks in connection with the inventive method as well.

In another embodiment of the invention, the cost sum is reserved in the cost account if a control request made by the billing system to the intermediate node beforehand has shown that the mobile terminal has retrieved the data. The method can also be in a form such that the billing system debits the cost account if a control request made by the billing system to the intermediate node beforehand has shown that the mobile terminal has retrieved the data. The two embodiments just mentioned ensure that, advantageously, the cost account is debited with a cost sum, or a sum of money in such a log account is reserved, only if tariff based data have actually been retrieved by the terminal. This allows the security of the system to be increased significantly if transmission errors occur or if dishonest debiting attempts are made.

In yet another embodiment of the invention, there is a data transmission network having an intermediate node used for data transmission and a billing system, where the intermediate node has an encryption device for generating an anonymous user identifier from a user address identifying the user of a mobile terminal, the billing system has a reception device for receiving messages including anonymous user identifiers, the billing system has a decryption device for recovering the user address from the anonymous user identifier using a key associated with the encryption method, and the billing system has debiting devices for debiting cost accounts which are associated with users of the mobile radio network.

This data transmission network can be in a form such that the billing system is connected to the intermediate node via a control interface which allows control requests and request responses to be exchanged between the billing system and the intermediate node, with the control requests and the request responses relating to retrieval of data which has been effected by the mobile terminal.

BRIEF DESCRIPTION OF THE INVENTION

To explain the invention further, reference is made to the drawings, in which:

FIG. 1 shows an exemplary embodiment of a data transmission network with exemplary method steps in accordance with the invention.

DETAILED DESCRIPTION OF THE INVENTION

FIG. 1 shows a terminal KEG which can be addressed using a user address MISISDN (Mobile Station ISDN number) which identifies the terminal user. This terminal KEG is connected to the mobile radio network MFN via an air interface. The mobile radio network MFN in turn is connected to the Internet I-NET via an intermediate node ZK. Connected to the Internet I-NET is a data store DS storing a large amount of data. A user of the terminal KEG can now use it to move through (browse) the Internet I-NET and in so doing to find information and data for whose use there is a charge.

The terminal KEG can be, by way of example, a mobile telephone, a laptop, a palmtop or a PDA (Personal Digital Assistant) with a mobile radio module. The intermediate node ZK can be a computer, for example, which connects the mobile radio network MFN to the Internet I-NET; such a computer can also be referred to as a "mobile smart proxy" computer. The intermediate node ZK can—as shown in the figure—be arranged outside the mobile radio network MFN and connected to the mobile radio network MFN. Alternatively, the intermediate node ZK can be formed by a node (e.g. a computer) in the mobile radio network. The data store DS can be implemented in conjunction with a server computer, which is operated by a "content provider" and is connected to the Internet.

As the user is searching, the user of the terminal KEG finds data which are of interest to him, for example in the form of an Internet page for which there is a charge to view it or in the form of a file for which there is a charge to access (download) it. This therefore involves machine-readable data provided for display on a display unit on the terminal (Internet page) or for further processing using a computer (PC, laptop, mobile phone) (file). To view the Internet page, i.e. to use the tariff based data, the terminal KEG sends a request message http1 which includes the user address MSISDN, identifying the user of the terminal KEG, and a data identifier (e.g. www.info1.de), identifying the data to be retrieved (i.e. in this case the Internet page to be retrieved), to the intermediate node ZK via the mobile radio network MFN. The intermediate node ZK includes a list WLIST including a listing of data identifiers (URLs=Uniform Resource Locators) for Internet pages from data providers (content providers) with whom the operator of the intermediate node has entered a contractual relationship which he takes as a basis for operating a collection service for this content provider.

If the data identifier transmitted with the request message does not appear on the list WLIST, then no billing is performed for the data access and the request message is forwarded to the Internet unchanged (not shown in the figure). In this case, the terminal KEG can be used to "surf" the Internet in the known manner. If the data identifier does appear on the list WLIST, however, the intermediate node encrypts the user address MSISDN contained in the request message.

Using a key KEY held at the intermediate node ZK, the user address MSISDN is encrypted; an anonymous user identifier AUID is produced. The key KEY is an alphanumeric character string known to the operator of the intermediate node ZK. Such encryption operations as such are common knowledge and can be performed using symmetrical encryption methods such as the DES method, the TRIPLE-DES method or the IDEA method. Alternatively, asymmetrical encryption methods such as the well-known RSA method can be used. Presented mathematically, the anonymous user identifier is calculated from the user address MSISDN and the key KEY in the encryption method:

$$AUID=f(MSISDN,KEY)$$

e.g. MSISDN=0049 0170 124568

→AUID=A3K4XX5

The intermediate node ZK stores request data, relating to the request message http1, in a control memory Mem; these request data are subsequently used in a control step to check the correctness of billing operations. Such request data stored can be, by way of example, the user address MSISDN, the user identifier AUID, the data identifier www.info1.de and the request time (time at which the request message was received by the intermediate node).

Following the encryption, the intermediate node ZK sends an anonymous request message http2, including the anonymous user identifier AUID in addition to the data identifier, via the Internet I-NET to the data store DS which includes the retrieved Internet page. In this case, the anonymous user identifier AUID and the data identifier can be transmitted, by way of example, in an "http header" in the anonymous request message http2. The connection between the intermediate node ZK and the data store DS can be protected cryptographically (for example using the cryptographic method SSL). This makes it possible to ensure that the anonymous user identifier AUID is not corrupted when transported to the data store DS. The data store DS receives the anonymous request message http2. From this anonymous request message http2, the data store identifies the sender of this message (in this case the intermediate node ZK). This identification can be made, by way of example, using the known "SSL Client Authorization" and/or using the IP address of the intermediate node ZK, which is transmitted together with the anonymous request message http2.

The operator of the data store (the content provider) has entered a contractual agreement with the operator of the intermediate node ZK (this has already been mentioned above in connection with the list WLIST). On the basis of this agreement, the operator of the data store DS knows that the operator of the intermediate node ZK operates a billing system AS (payment system). The billing system AS can—as shown in the figure—be arranged outside the mobile radio network MFN and connected to the mobile radio network MFN via the intermediate node. Alternatively, the billing system AS can be part of the mobile radio network MFN, that is to say can belong to the mobile radio network MFN.

This billing system AS is also used by the data store DS to bill for tariffable use of data. The data store DS now ascertains the retrieved data (that is to say, in this case, makes the retrieved Internet page www.info1.de available) and takes a cost variable associated with this page as a basis for ascertaining the cost which needs to be calculated every time the page is retrieved. The data store DS then sends a reservation message Res (containing the cost variable and the anonymous user identifier AUID) to the billing system AS. The connection between the data store DS and the billing system AS can be protected using the known SSL method for example. The billing system AS receives the reservation message Res using a reception device E, the reception device E being set up to receive messages including anonymous user identifiers AUID. The billing system AS has the key KEY which has been used by the intermediate node ZK for encrypting the user address MSISDN. Using this key KEY, the billing system AS can decrypt the anonymous user identifier AUID and can thus recover the user address MSISDN in plain text. Using the user address MSISDN, it is possible to access a cost account belonging to the user of the communication terminal KEG. In this case, the user of the terminal KEG has a prepaid cost account V-KK (a "prepaid account") which he normally uses to pay for the costs incurred. The billing system AS sends an altered reservation message Res2 (including the user address MSISDN) to the prepaid cost account V-KK and thus reserves in this prepaid cost account V-KK a cost sum corresponding to the cost variable. If this reservation is made successfully (e.g. because the prepaid cost account contains an appropriate level of credit), the billing system AS sends a reservation success message Res_OK to the data store. The data store DS then uses a data transmission message data to transmit the tariff based data provided in the form of the Internet page via the Internet and the intermediate node ZK to the terminal KEG. For this transmission, it is possible, by way of example, to use a data link ("socket") between the data store DS and the terminal KEG which has already been set up for transmitting the request message http1. The terminal then has the retrieved tariffable Internet page available. The data store DS learns, for example via the protocol TCP (Transmission Control Protocol) used for data transmission on the Internet, of the successful transmission of the Internet page to the communication terminal KEG. The data store DS then sends a debit message Char, including the anonymous user identifier AUID and the cost variable, to the billing system AS. The billing system AS then uses a debiting device B to debit the corresponding sum from the cost account, and in so doing debits all or part of the previously reserved cost sum (Char(MSISDN) message). Following successful debiting, the billing system AS sends a debit success message Char_OK to the data store DS, and the data store DS stores this debit success message in an archive file LOG. The billing system AS can provide (sign) the debit success message with a signature from the billing system, and this allows the origin of the debit success message (that is to say the sender, in this case the billing system AS) to be proved later as well. The billing operation is thus complete.

If a user of the terminal KEG does not have a prepaid account V-KK, but rather pays the costs he incurs after receipt of an invoice, then instead of the altered debit message Char(MSISDN) in the exemplary embodiment described up to now, a ticket message TICK can be generated and sent to a registration cost account R-KK. Using the data stored in this registration cost account, an invoice R (e.g. a monthly telephone bill) is then produced at the end of the respective billing period and is sent to the user of the terminal KEG. If a registration cost account is used, prior reservation of the cost sum is generally not necessary, since the terminal user generally settles all the costs posted on an invoice R.

The prepaid cost account V-KK and the registration cost account R-KK can—as shown in the figure—be arranged outside the billing system AS and connected thereto. Alternatively, the two cost accounts V-KK and R-KK can be part of the billing system AS.

The billing system AS can be connected to the intermediate nodes ZK via an internal control interface KS which is not publicly accessible. This control interface KS can be used to implement an additional protective measure. To prevent the data store DS from carrying out unjustified reservation requests or debit requests using an anonymous user identifier AUID (possibly known from earlier business dealings), the billing system AS reserves the cost sum in the cost account if a control request made by the billing system AS to the intermediate node ZK beforehand has shown that the mobile terminal KEG has actually retrieved the data on which the reservation request is based. If the intermediate node ZK returns a corresponding control request response KAA to the billing system AS is a reservation made. Similar method steps can be applied before the cost account is debited.

When a control request KA has been received, the intermediate node ZK checks whether it has actually been used to retrieve the corresponding tariff based data for which there is now a reservation request or a cost account debit request. This can be implemented, by way of example, such that, together with the control request KA, the data identifier and the anonymous user identifier are also sent (which the billing system AS has received from the data store DS with the corresponding reservation request or debit request). On the basis of the data identifier and the anonymous user identifier AUID, the intermediate node ZK can now use the request data stored in the control memory Mem to establish whether it has received (e.g. immediately beforehand—the components involved in the method operate virtually in real time, for example) a request message from the terminal KEG which contains the corresponding data identifier and which contains the user address MSISDN which has been encrypted to form the anonymous user identifier AUID. For this check, instead of the user identifier AUID, it is also possible to use the user address MSISDN which has been calculated beforehand by the billing system AS from the user identifier AUID.

The mobile radio network MFN, the intermediate node ZK, the billing system AS, the prepaid cost account V-KK and the registration cost account R-KK are controlled by one and the same operator; these network elements are in the "operator domain" OD. This is symbolized by a dotted line in FIG. 1. By contrast, the data store DS is controlled by a data provider; the data store is arranged in a "content provider domain" CP. This sphere of influence CP is symbolized by a dash-dot line in the figure.

A particular advantage of the method described is that an operator of the data store DS (also referred to as the content provider on a content server) does not find out the user address MSISDN of the terminal KEG and therefore cannot draw any conclusions about the user's person and cannot use this user address to send him unwanted advertising, for example. As a result of the encryption with the same key using a mobile radio user's user address, which is generally the same, the data store can identify that the same user is involved from repeated method cycles, however. The data store can thus create and maintain user profiles ("what has this user already purchased from here?", creation and storage of personal settings), and this user can also be granted quantity discounts or other discounts, for example. This is possible because the anonymous user identifier AUID is always the same for the user. (The user identifier AUID is the same for the user if, for example, the user uses the same terminal KEG into which he inserts the same SIM card, which means that he is using the same mobile radio call number MSISDN.) Another particular advantage is that the user of the terminal KEG can be safely identified using his user address (e.g. his mobile radio call number MSISDN), which means that it is not necessary to enter an additional user name or an associated password. This allows the method to take a very convenient and user-friendly form.

What is claimed is:

1. A method for operating a billing system associated with a mobile radio network for billing for tariff based use of data provided by a network-external data store, where the data are used based on retrieval using a mobile terminal belonging to a user of the mobile radio network, comprising:
   transmitting, by the mobile terminal, a user address, identifying the user, and a data identifier, identifying the data which are to be retrieved, to an intermediate node connected to the mobile radio network;
   generating, by the intermediate node, an anonymous user identifier from the user address using encryption;
   transmitting, by the intermediate node, the anonymous user identifier and the data identifier to the data store, as a result of which the data store is prompted to transmit a cost variable, associated with the retrieved data, and the anonymous user identifier to the billing system;
   using a key associated with the encryption to recover the user address from the anonymous user identifier; and
   using the user address and the cost variable to debit a cost account which is associated with the user.

2. The method as claimed in claim 1, wherein the intermediate node can be connected to the data store via the Internet.

3. The method as claimed in claim 1, wherein the billing system debits the user's cost account by:
   a cost sum being reserved in the cost account in line with the cost variable,
   a reservation success message being transmitted from the billing system to the data store upon successful reservation, as a result of which the data store is prompted to transmit the retrieved data to the user's terminal via the intermediate node and, upon successful transmission, to send a debit message, including the anonymous user identifier and the cost variable, to the billing system, and
   the billing system then debiting the cost account in line with the cost variable.

4. The method as claimed in claim 1, wherein when the cost account has been debited by the billing system, a debit success message is transmitted to the data store, as a result of which the data store is prompted to store data relating to the debiting of the account for a subsequent debit check.

5. The method as claimed in claim 4, wherein the billing system provides the debit success message with a signature from the billing system, as a result of which it is possible to prove the origin of the debit success message.

6. The method as claimed in claim 1, wherein the cost account debited is a prepaid cost account belonging to the user.

7. The method as claimed in claim 1, wherein the cost account debited is a registration cost account belonging to the user, with the entries in the registration cost account being used, following use of the retrieved data, to invoice the user.

8. The method as claimed in claim 1, wherein the cost sum is reserved in the cost account if a control request made by the billing system to the intermediate node indicates that the mobile terminal has retrieved the data.

9. The method as claimed in claim 1, wherein the billing system debits the cost account if a control request made by the billing system to the intermediate node beforehand indicates that the mobile terminal has retrieved the data.

10. A data transmission network, comprising:
    an intermediate node for data transmission, the intermediate node has an encryption device for generating an anonymous user identifier from a user address identifying the user of a mobile terminal; and
    a billing system, the billing system has a reception device for receiving messages including anonymous user identifiers, wherein
    the billing system has a decryption device for recovering the user address from the anonymous user identifier using a key associated with the encryption device, and
    the billing system has a debiting device for debiting cost accounts which are associated with users of the mobile radio network.

11. The data transmission network as claimed in claim 10, wherein the billing system is configured to be connected to the intermediate node via a control interface which allows control requests and request responses to be exchanged between the billing system and the intermediate node, with the control requests and the request responses relating to retrieval of data which has been effected by the mobile terminal.

* * * * *